(No Model.)
W. H. RICHTER.
SULKY.
No. 497,501. Patented May 16, 1893.
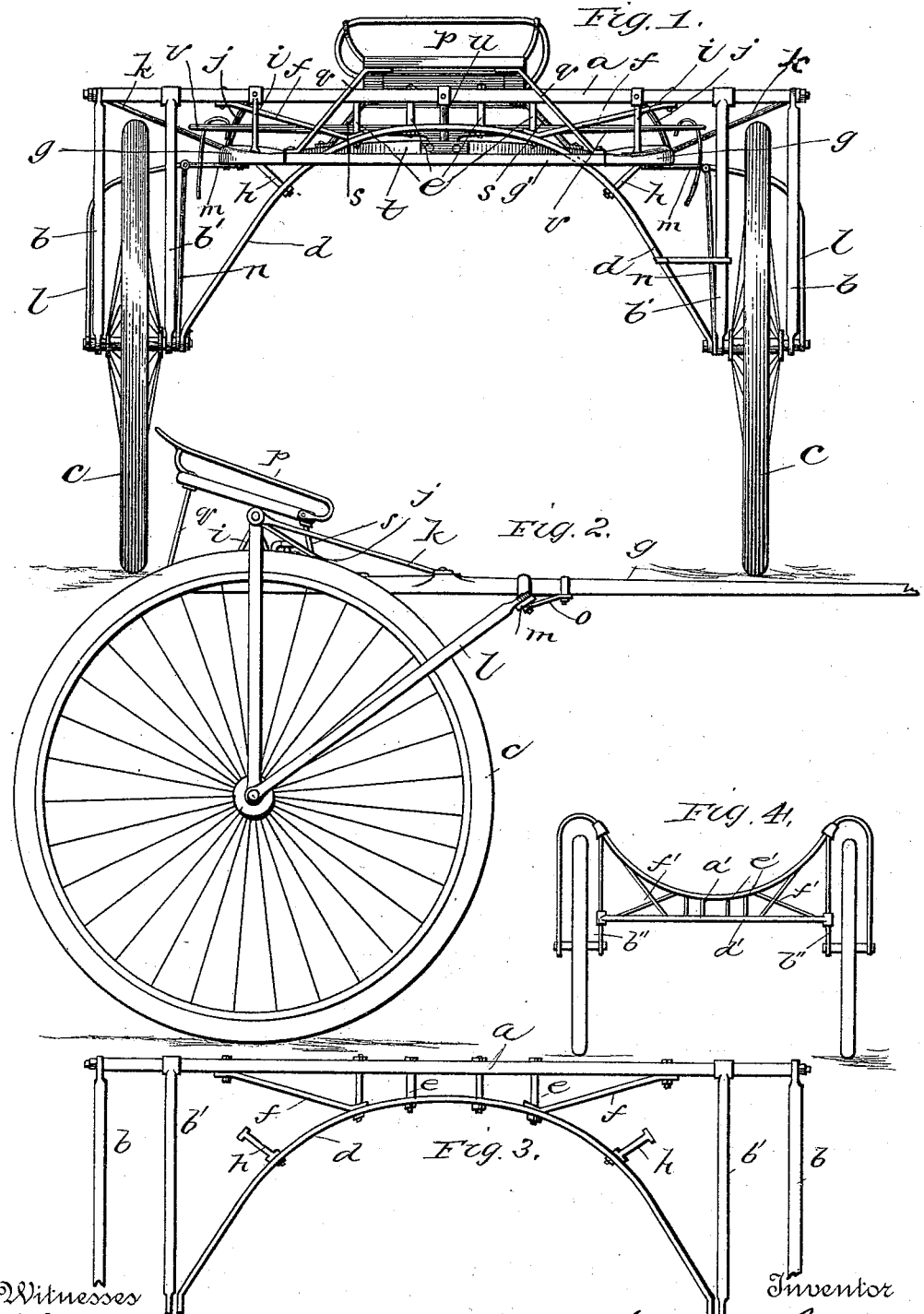
Witnesses
Inventor
William H. Richter
By Alexander Davis
Attorneys

UNITED STATES PATENT OFFICE.

WILLIAM H. RICHTER, OF BENVENUE, PENNSYLVANIA.

SULKY.

SPECIFICATION forming part of Letters Patent No. 497,501, dated May 16, 1893.

Application filed February 25, 1893. Serial No. 463,716. (No model.)

*To all whom it may concern:*

Be it known that I, WILLIAM H. RICHTER, a citizen of the United States, residing at Benvenue, in the county of Dauphin and State of Pennsylvania, have invented certain new and useful Improvements in Sulkies, of which the following is a specification, reference being had therein to the accompanying drawings.

This invention relates to a new and improved sulky, and it relates particularly to that class of sulkies in which pneumatic-tired wheels are employed.

The invention has for its object to provide a sulky frame with which may be used wheels of forty inches in diameter, which is found to be the most suitable size for trotting sulkies, and to so construct such frame as to secure great strength and rigidity combined with extreme lightness.

In the drawings:—Figure 1 is a rear view of my improved sulky. Fig. 2 is a side elevation; and Fig. 3 is a detail of the main supporting frame; and Fig. 4 is a view of a modified form of the supporting frame.

Referring to the parts by letters $a$ designates the axle, which is tubular and straight, and extends across the sulky above the wheels.

$b\ b'$ are two downwardly extending tubes or bars which are carried by the axle at each end thereof.

$c\ c$ are forty-inch pneumatic tired wheels which are supported at the lower ends of, and between each pair of depending bars $b\ b'$.

$d$ is an upwardly curved rod or bar which is connected at its ends to the lower ends of the bars $b'$, and curves upwardly and is close to the axle at the center thereof.

$e$ designates four vertical bolts which connect the axle to the curved bar $d$, said bolts being spaced equal distances from each other and on each side of the center of the axle.

$f\ f$ are two inclined brace bars which are secured at their lower ends to the curved bar $d$ at the base of the outer-most bolt $e$, and at their upper ends to the axle $a$, near the inner depending bars $b'$. It will thus be seen that the axle $a$ is rigidly braced throughout its length, thereby preventing it from being twisted or bent, and the curved bar $d$ prevents the spreading of the depending bars $b'$, thereby securing the wheels in their proper position. The bar $d$ is thoroughly braced throughout and forms with the axle and the braces a rigid truss-like frame in which the wheels are supported, and prevented from spreading, or twisting on their axles. The shafts $g\ g$ are supported by the frame between the axle and the bar $d$ by upwardly and outwardly inclined braces $h\ h$ which are secured at their lower ends to the bar $d$ and at their upper ends to the shafts.

$i\ i$ are depending supporting rods, secured at their upper ends to the axle $a$ near the braces $f$, their lower ends being bolted to the upper side of the shafts.

$j\ j$ are downwardly and forwardly inclined brace bars, secured at their upper ends to the axle $a$ near the braces $i$, their lower ends being secured to the shafts as shown clearly in Fig. 2.

$k\ k$ are forwardly inclined brace rods secured at their upper rear ends to the outer ends of the axle, their front ends extending a suitable distance in front of the forward end of the braces $i$, said ends being bolted to the shafts $g$, as shown.

$l\ l$ are forwardly extending draft rods, whose rear ends are secured to the outer ends of the short axles on bearings of the wheels $c$, their forward ends being secured to the outwardly extending plates $m$ which are secured to the under side of the shafts.

$n\ n$ are forwardly entending draft rods which are secured to the inner ends of the wheel bearings, their forward ends being also secured to the plates $m$.

$o\ o$, are braces for plates $m$ which are secured to the outer ends of the plates and to the shafts.

The seat P is mounted directly on the axle $a$ and is supported in the rear of the axle by the braces $q$ which are secured to the rear end of the seat and to the rear connecting bar $g'$ of the shafts, the braces $s$ supporting it in front of the axle, said braces being connected to the front of the seat and to the rearwardly curved cross bar $t$ of the shafts. This cross-bar $t$ is supported at its middle by a depending rod $u$ which is secured at its upper end to the axle $a$.

$u$ is the whiffletree which is pivoted on this curved cross-bar.

In the modifications shown in Fig. 4, the axle $a'$ is curved downwardly between the rods $b'' b''$, and the cross-bar $d'$ is straight, and connects the rods $b''$ near their lower ends. The axle $a'$ and cross-bar $d'$ are connected by the bolts $e'$ and the crossed braces $f'-f'$, thereby making a very strong and rigid truss-like supporting frame.

From the foregoing it will be readily understood that I provide a sulky frame of simple construction which will be light and durable and which will permit the use of pneumatic tired wheels of forty inches in diameter.

Having thus fully described my invention, what I claim is—

1. A sulky consisting of an axle extending across the vehicle above the wheels, a pair of depending arms carried at each end of the axle, a wheel supported between each pair of arms in bearing carried in the lower ends of the arms, an upwardly curved bar connecting the lower ends of the inner depending arms, braces connecting the curved bar and the axle, shafts supported by the frame between the curved bar and the axle, and braces for said shafts, said braces being connected to the axle and to the curved bar, substantially as described.

2. A frame for a sulky consisting of a straight axle $a$, a pair of depending bars $b\ b'$ secured at each end of the axle, wheels $c$ carried between these bars at their lower ends, an upwardly curved bar $d$ connecting the lower ends of the inner depending bars, said bar $d$ at its middle extending nearly to the axle, vertical bolts $e$ connecting the axle and the bar $d$ and inclined braces $f$ connecting the bar $d$ and the axle, substantially as described.

3. A sulky consisting of the axle $a$, the depending bars $b$ and $b'$ carried thereby, wheels $c$, curved bar $d$ connecting the inner ends of the bars $b'$, bolts $e$ and braces $f$ connecting the axle and the bar $d$ shafts $g$ supported between the axle and the bar $d$, braces connected to said shafts and to the bar $d$, and braces connected to the shafts and to the axle $a$, braces $k\ k$ connected to the outer ends of the axle and extending forward and being secured to shafts, and draft rods secured at their rear ends to the short axles or bearings of the wheels and the forward ends being secured to the shafts, substantially as described.

4. In a sulky, the combination of a pair of wheels, vertical supporting bars therefor, a rigid frame connecting the supporting bars, said frame consisting of an axle and a brace, one or the other being bowed and the two being connected rigidly by vertical braces, and the shafts and a seat, substantially as described.

In testimony whereof I affix my signature in presence of two witnesses.

WILLIAM H. RICHTER.

Witnesses:
C. D. DAVIS,
WM. R. DAVIS.